(12) United States Patent
Liu et al.

(10) Patent No.: US 7,979,606 B2
(45) Date of Patent: Jul. 12, 2011

(54) METHOD FOR STORING DATA

(75) Inventors: Ming-Feng Liu, Taipei (TW); Chun-De Lin, Taipei County (TW)

(73) Assignee: Compal Electronics, Inc., Taipei (TW)

( * ) Notice: Subject to any disclaimer, the term of this patent is extended or adjusted under 35 U.S.C. 154(b) by 149 days.

(21) Appl. No.: 12/041,671

(22) Filed: Mar. 4, 2008

(65) Prior Publication Data

US 2009/0119424 A1 May 7, 2009

(30) Foreign Application Priority Data

Nov. 2, 2007 (TW) ................................ 96141561 A

(51) Int. Cl.
G06F 3/00 (2006.01)
G06F 5/00 (2006.01)
G06F 13/00 (2006.01)
G06F 13/28 (2006.01)

(52) U.S. Cl. ..................... 710/52; 711/118; 711/133

(58) Field of Classification Search .................. None
See application file for complete search history.

(56) References Cited

U.S. PATENT DOCUMENTS

| 7,152,147 | B2 * | 12/2006 | Suzuki ............................. 711/162 |
| 7,383,388 | B2 * | 6/2008 | Lewis ............................. 711/118 |
| 7,519,764 | B2 * | 4/2009 | Kim et al. ......................... 711/103 |
| 7,594,087 | B2 * | 9/2009 | Zeevi et al. ........................ 711/165 |
| 2003/0043627 | A1 * | 3/2003 | Moschopoulos et al. .............. 365/185.11 |
| 2006/0151617 | A1 * | 7/2006 | Masubuchi ........................ 235/492 |
| 2006/0206681 | A1 * | 9/2006 | Suzuki et al. ..................... 711/170 |
| 2007/0168632 | A1 * | 7/2007 | Zeevi et al. ........................ 711/165 |
| 2008/0288669 | A1 * | 11/2008 | Tong et al. ......................... 710/18 |

OTHER PUBLICATIONS

Hai Jin; Peng Cheng; Jiangling Zhang; , "Buffer system for optical storage system," Communications, Computers and Signal Processing, 1997. '10 Years PACRIM 1987-1997—Networking the Pacific Rim'. 1997 IEEE Pacific Rim Conference on , vol. 1, no., pp. 134-137 vol. 1, Aug. 20-22, 1997 doi: 10.1109/PACRIM.1997.619919.*

* cited by examiner

Primary Examiner — Tariq Hafiz
Assistant Examiner — Dayton Lewis-Taylor
(74) Attorney, Agent, or Firm — Jianq Chyun IP Office

(57) ABSTRACT

A method for storing data is disclosed. The method is used for storing data into a program memory used for storing program codes. The program memory is divided into a first buffer storage area and a second buffer storage area. By alternate accessing of the first buffer storage area and the second buffer storage area, instantly accessible data can be stored in the program memory, such that the conventional data memory can be replaced by the program memory of the present invention and the cost of the product can be reduced.

17 Claims, 7 Drawing Sheets

METHOD FOR STORING DATA

CROSS-REFERENCE TO RELATED APPLICATION

This application claims the priority benefit of Taiwan application serial no. 96141561, filed on Nov. 2, 2007. The entirety the above-mentioned patent application is hereby incorporated by reference herein and made a part of specification.

BACKGROUND OF THE INVENTION

1. Field of the Invention

The present invention relates to a method for storing data. More particularly, the present invention relates to a method for storing data into a program memory.

2. Description of Related Art

With development of technology, various kinds of electronic products are provided. Correspondingly, commercial competition of electronic industry is increasingly intensive. Besides developing various functional innovations on the products to gain more commercial opportunities, reducing cost of the products is also an indispensable method for enhancing competitiveness of the products.

Since the computer system is increasingly complicated, a large amount of electronic devices such as south bridge chips, north bridge chips, memories, and power supply chips etc. are applied to a motherboard of the computer system. Particularly in aspect of the memories, to cope with functional refinement of the computer system, different kinds of memories such as electrically erasable programmable read-only memories (EEPROMs), and serial peripheral interface read-only memories (SPI ROMs) are applied to the motherboard.

However, the SPI ROM may only be written with "0" (initial value thereof is "1"), and therefore the SPI ROM is generally used for storing program codes of software programs that are seldom changed, and the EEPROM is generally used for storing data that are usually varied.

FIG. 1 is a schematic diagram illustrating a method for accessing a memory of a conventional computer system. Referring to FIG. 1, a computer system 110 may send an instruction to a controller 130 via a low pin count (LPC) bus 120. The controller 130 then assesses a SPI ROM 160 via a serial peripheral interface (SPI) bus 140 or accesses an EEPROM 170 via a system management bus (SM-bus) 150 according to the instruction.

Referring to FIG. 1 again, in such structure, the SPI ROM 160 is functioned as the program memory and generally remains a lot of unused regions due to lack of stored program data, which may cause a waste of memory space. Moreover, the EEPROM 170 used for storing data not only occupies space of the motherboard, but also has a relatively high cost, such that fabrication cost of the product is increased. Accordingly, the structure of the conventional computer system is not economical.

SUMMARY OF THE INVENTION

Accordingly, the present invention is directed to a method for storing data, by which a controller may store data into a program memory used for storing program codes.

To achieve the aforementioned and other objectives, the present invention provides a method for storing data, by which the data may be stored into a program memory used for storing program codes. The program memory is divided into a first buffer storage area and a second buffer storage area. The first buffer storage area includes a first data area and a first mark area. The second buffer storage area includes a second data area and a second mark area. The method for storing data includes following steps. First, a data storage instruction is received. Next, the data is stored into the first data area, and a first mark data is written into the first mark area for marking blocks written with data in the first data area. Finally, data stored in the second data area is copied to the first data area, and the blocks in the first data area that are marked by the first mark data as being written with data is not covered by the data copied to the first data area.

In an embodiment of the present invention, after the data stored in the second area is copied to the first data area, the data stored in the second buffer storage area is further removed.

In an embodiment of the present invention, after the data stored in the second buffer storage area is removed, another data storage instruction is received. Next, another data is stored into the second data area, and a second mark data is written into the second mark area for marking blocks written with the other data in the second data area. When data storage is completed, the data stored in the first data area is copied to the second data area, and the blocks in the second data area that are marked by the second mark data as being written with the data is not covered by the data copied to the second data area. Finally, the data stored in the first buffer storage area is removed.

In an embodiment of the present invention, after the data storage instruction is received, whether or not the first buffer storage area is stored with the data is further judged. If not, the data is stored into the first data area. Conversely, if yes, the data is stored into the second area.

In an embodiment of the present invention, in the step that the data is stored into the first data area, information that the data is written into the first data area is further recorded to a first specific bit of the first data area.

In an embodiment of the present invention, after the data stored in the second data area is copied to the first data area, information that the data stored in the second data area is copied is further recorded to a second specific bit of the first data area.

In an embodiment of the present invention, after the data storage instruction is received, the first specific bit and the second specific bit of the first data area are further checked to judge a present storage state of the data.

In an embodiment of the present invention, the step of removing the data stored in the second buffer storage area includes removing the data stored in the second buffer storage area and changing the content thereof to be 0xFF.

In an embodiment of the present invention, the data storage instruction is transmitted by a microprocessor of a system, and an access for the program memory is performed by the controller.

In an embodiment of the present invention, the first buffer storage area and the second buffer storage area are defined according to a data storage requirement of the system.

In an embodiment of the present invention, the first data area, the second data area, the first mark area and the second mark area have the same size. Sizes of the first buffer storage area and the second buffer storage area are respectively 4K, and sizes of the first data area, the second data area, the first mark area and the second mark area are respectively 2K.

In an embodiment of the present invention, the program memory is a SPI ROM, and the data is instantly accessible data originally stored in an EEPROM.

The present invention provides another method for storing data, by which the data may be stored into a program memory used for storing program codes. The program memory includes a first data area, a second data area and a mark area. The method for storing data includes following steps. First, a data storage instruction is received. Next, the data is stored into the first data area, and a first mark data is written into the mark area for marking blocks written with data in the first data area. Finally, data stored in the second data area is copied to the first data area, and the blocks in the first data area that are marked by the first mark data as being written with data is not covered by the data copied to the first data area.

In an embodiment of the present invention, sizes of the first data area, the second data area and the mark area are the same.

In an embodiment of the present invention, sizes of the first data area, the second data area and the mark area are respectively 4K.

In the present invention, the two sets of buffer storage areas are arranged in the program memory for accessing data alternately, where the instantly accessible data originally to be stored in data memory may be stored in the program memory used for storing program codes, so as to effectively utilize the memory and reduce the cost of the product.

In order to make the aforementioned and other objects, features and advantages of the present invention comprehensible, a preferred embodiment accompanied with figures is described in detail below.

DESCRIPTION OF EMBODIMENTS

Since a SPI ROM has a feature that only "0" may be written thereon, it cannot serve as a memory for storing instantly accessible data. In a method for storing data provided by the present invention, a program memory is divided into a plurality of storage areas for alternately accessing data, such that the SPI ROM may successfully store the instantly accessible data and substitute a conventional relatively expensive EEPROM. To further convey the spirit of the present invention, embodiments are provided for describing the present invention in detail.

Figure 1:
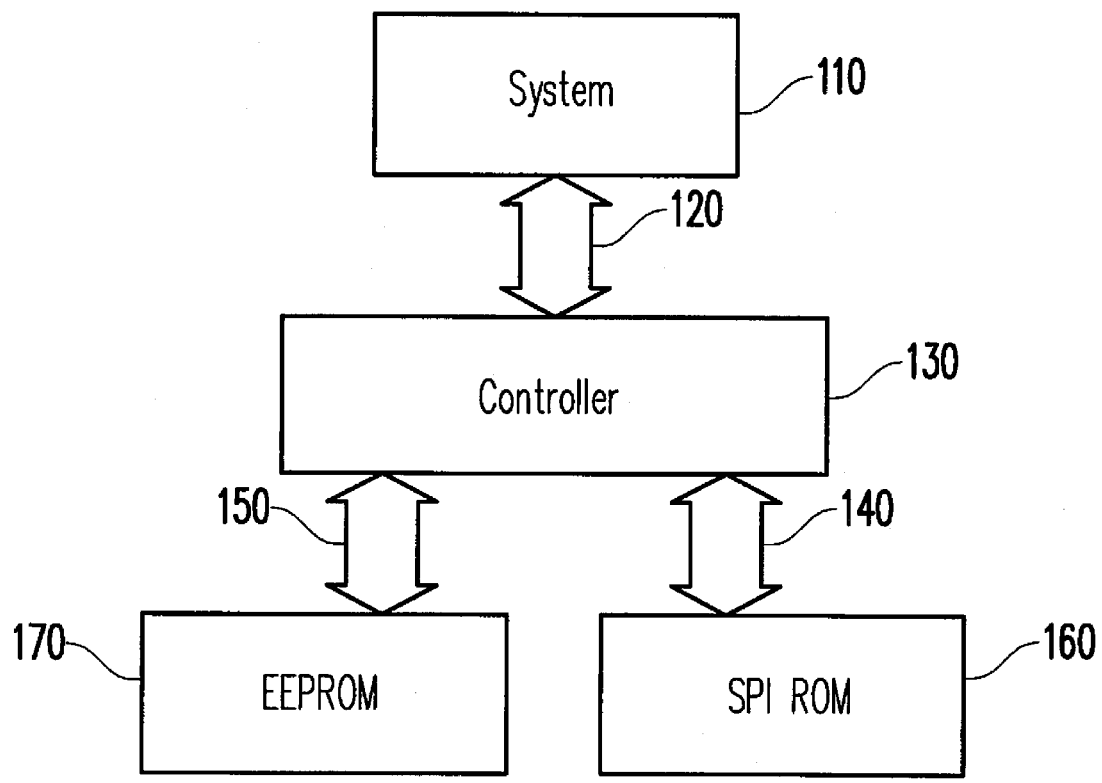
FIG. 1 is a schematic diagram illustrating a memory accessing method for a conventional computer system.
Figure 2:
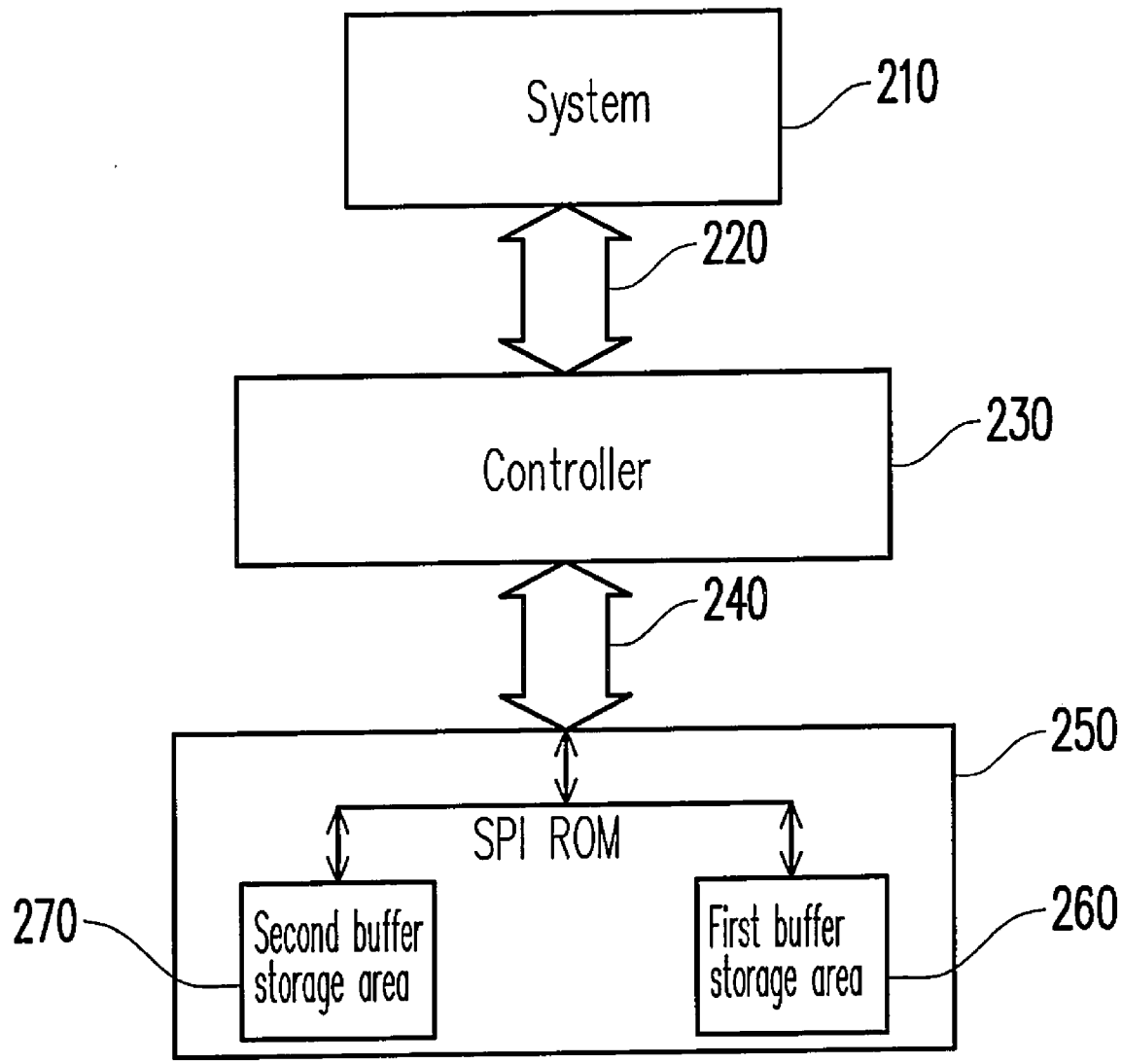
FIG. 2 is a block diagram illustrating a system applying a method for storing data according to an exemplary embodiment of the present invention.

FIG. 2 is a block diagram illustrating a system applying a method for storing data according to an exemplary embodiment of the present invention. Referring to FIG. 2, the structure of the present embodiment includes a system 210, a low pin count (LPC) bus 220, a controller 230, a SPI bus 240 and a SPI ROM 250. The system 210 is coupled to the built-in controller 230 via the LPC bus 220, and the controller 230 is coupled to the CPI ROM 250 via the SPI bus 240.

The system 210 includes a general computer microprocessor. The system 210 may divide an area in the SPI ROM 250 not utilized by storing the program data into a first buffer storage area 260 and a second buffer storage area 270 according to an actual data storage requirement of the system 210. When data is about to be written into the SPI ROM 250, the system 210 sends a data storage instruction to the controller 230 via the LPC bus 220. The controller 230 receives the data storage instruction and writes the data into one of the buffer storage area of the SPI ROM 250, for example, into the first buffer storage area 260 via the SPI bus 240. After the controller 230 completes writing the data into the first buffer storage area 260, the data stored in the corresponding area of the second buffer storage area 270 is further copied to an area with no data written thereon in the first buffer storage area 260. Finally, the data stored in the second buffer storage area 270 is removed, and the data writing process is complete.

Referring to FIG. 2 again, when new data is about to be written into the SPI ROM 250, the system 210 sends a new data storage instruction to the controller 230 via the LPC bus 220. The controller 230 receives the new data storage instruction and writes the data into the second buffer storage area 270 of the SPI ROM 250 via the SPI bus 240. Compared to the previous data writing operation, after the controller 230 completes writing the new data into the second buffer storage area 270, data stored in the corresponding area of the first buffer storage area 260 is further copied to an area with no data written thereon in the second buffer storage area 270. Finally, data stored in the first buffer storage area 260 is removed, and the new data writing process is complete.

By the aforementioned data writing operations, the controller 230 may alternately access the data stored in the first buffer storage area 260 and the second buffer storage area 270, such that storage of instantly accessible data in the SPI ROM may be achieved.

Figure 3:
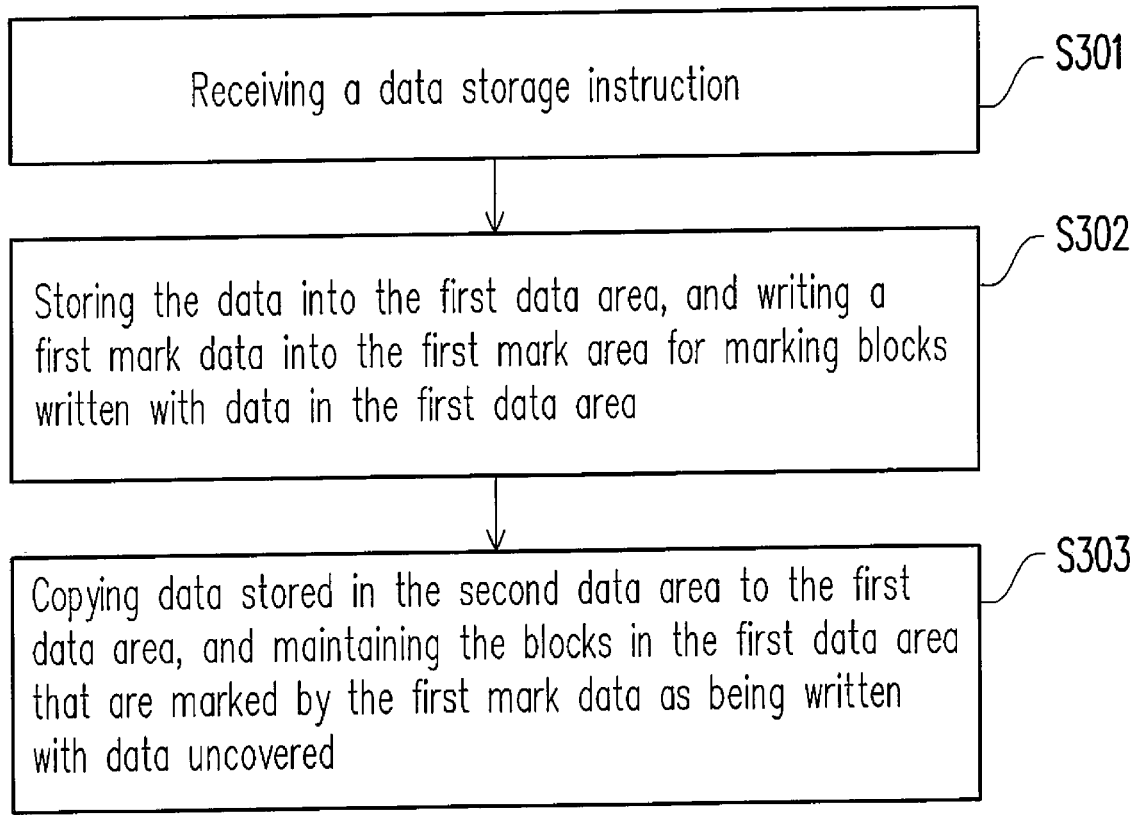
FIG. 3 is a flowchart illustrating a method for storing data according to an exemplary embodiment of the present invention.

FIG. 3 is a flowchart illustrating a method for storing data according to an exemplary embodiment of the present invention. Referring to FIG. 3, a main objective of this method is to store the data into the program memory used for storing program codes. In the present embodiment, the program memory used for storing program codes may be a SPI ROM. Referring to FIG. 2 and FIG. 3, in the present embodiment, besides the first buffer storage 260 and the second buffer storage area 270 are arranged in the SPI ROM 250 by the controller 230, a first data area and a first mark area are further arranged in the first buffer storage area 260, and a second data area and a second mark area are further arranged in the second buffer storage area 270.

Referring to FIG. 3 again, first, the controller 230 receives a data storage instruction from the system 210 (step S310). Next, the controller 230 stores the data into the first data area, and writes a first mark data into the first mark area (step S320). Wherein, the first mark data is written in order to mark the blocks with data written thereon in the first data area, so as to guarantee the data on the blocks is not covered by the data copied to the first data area. Finally, data stored on the second data area is copied to the first data area (step S330). During data copy, the data stored in the second data area may only be copied to the blocks not written with data in the first data area according to the first mark data, so as to guarantee the marked blocks with data written thereon in the first data area is not covered.

Figure 4:
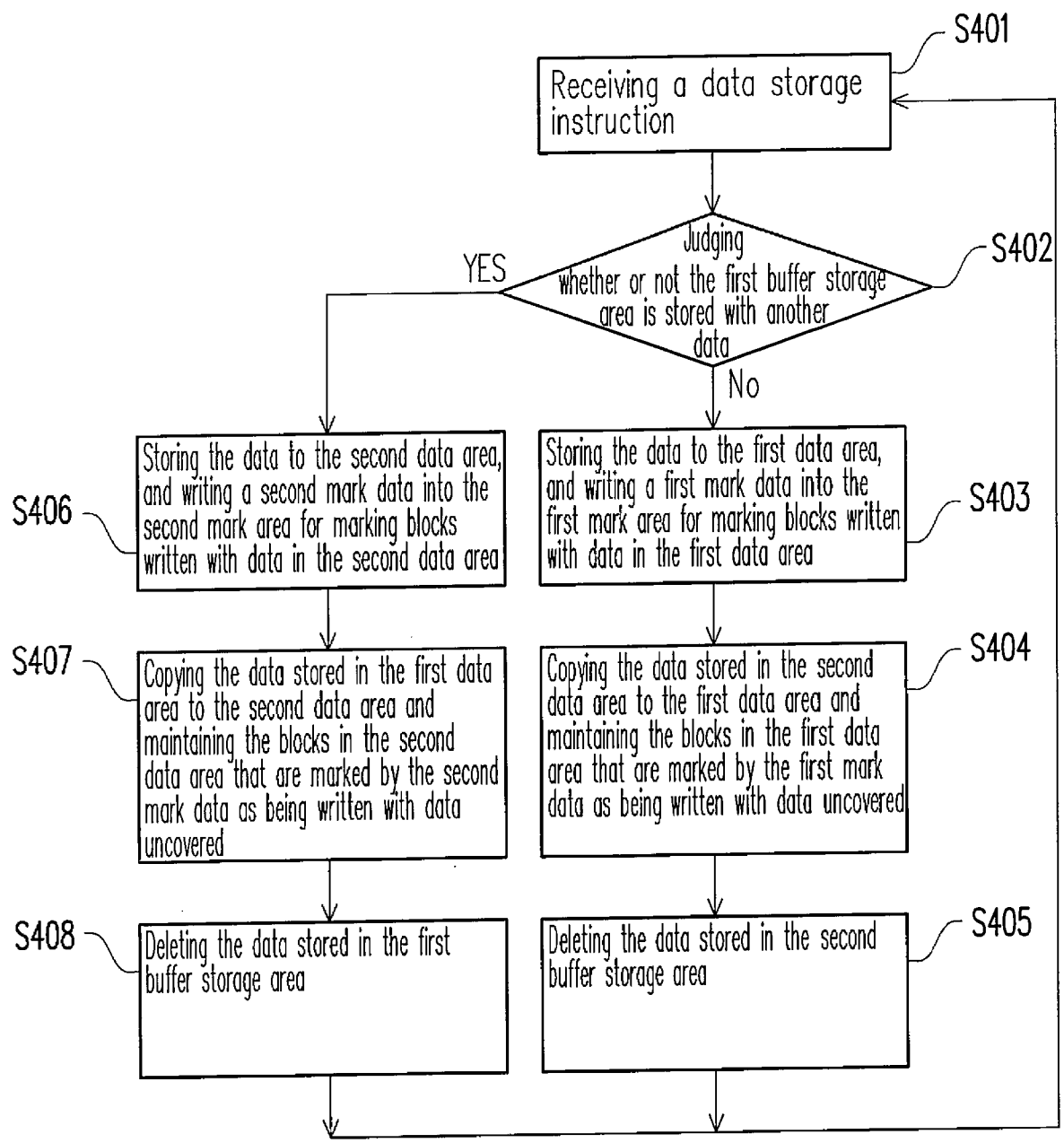
FIG. 4 is a flowchart illustrating a method for storing data according to another embodiment of the present invention.

FIG. 4 is a flowchart illustrating a method for storing data according to another embodiment of the present invention. Referring to FIG. 2 and FIG. 4, in the present embodiment, the controller 230 divides the SPI ROM 250 into the first buffer storage area 260 and the second buffer storage area 270 respectively with a size of 4K bytes, and sizes of the first data area, the first mark area, the second data area and the second mark area are respectively 2K bytes. By such division, each byte in the data area corresponds to a byte in the mark area, and each time when data is written into a certain byte of the data area, a corresponding byte in the mark area is then marked for indicating that the byte in the data area is written with data.

It should be noted that according to another division method, each byte in the data area corresponds to a bit in the mark area, and each time when data is written into a certain byte of the data area, a corresponding bit in the mark area is then marked (for example, written with "0") for indicating that the byte in the data area is written with data. According to such division method, size of the mark data is only one bit, and compared to the previous division method applying a byte for marking, occupied memory space based on such division method is only one eighth compared to that of the previous division method (one byte has eight bits), such that memory space is effectively saved. However, the aforementioned division methods are only for examples, and the present invention is not limited thereto. Those skilled in the art should be understood that the memory space with different sizes may also be applied for marking data according to an actual requirement. Detailed description of the method for storing data of the present invention is set forth below:

First, the controller 230 receives a data storage instruction from the system 210 (step S401). After the controller 230 receives the data storage instruction, whether or not the first buffer storage area 260 is stored with another data is then judged (step S402). If not, the first data area is free to be written with data, and the controller 230 then stores the data into the first data area. Conversely, if yes, the controller 230 then stores the data into the second data area.

In the step S402, if the first buffer storage area 260 is judged to have no data stored thereon, the controller 230 then stores the data to the first data area, and meanwhile a first mark data is written into the first mark area for marking blocks written with data in the first data area (step S403). For example, if a tenth bit of the first mark area is written with 00, it represents the block of the tenth bit in the first data area is written with data.

It should be noted that in step S403, information that data is written into the first data area is further recorded to a first specific bit of the first data area by the controller 230. The first specific bit may be a bit selected from the first data area (which is generally located in the last of the first data area), and is used for recording whether or not the first data area is written with data, so as to provide such information for judgement of the controller when a next data is written. For example, "0" may be assigned to represent that the first data area is written with data, and if the controller reads a value "0" from the first specific bit, it represents that the first data area is written with data, and the data may be written into the second data area. Correspondingly, if the controller reads a value "1" from the first specific bit, it represents that the first data area is not written with data, and the data may be written into the first data area.

Next, after the data is written into the first data area, the controller 230 copies data stored in the second data area to the first data area and remains the blocks in the first data area that are marked by the first mark data as being written with data uncovered (step S404). After the data stored in the second data area is copied to the first data area, a record is further written into a second specific bit of the first data area by the controller 230. The second specific bit is another bit selected from the first data area, and is used for recording information that data copy is completed. For example, if the second specific bit is "0", it represents the data stored in the second data area is copied to the first data area, and therefore when the controller 230 reads the value "0" from the second specific bit, it represents the data stored in the second data area is copied to the first area. Correspondingly, if the controller reads a value "1" from the second specific bit, it represents that the data stored in the second data area is still not copied to the first area.

Finally, the controller 230 removes the data stored in the second buffer storage area 270 (step S405). In the present embodiment, the step of removing the data stored in the second buffer storage area 270 includes removing the data stored in the second buffer storage area 270 and changing the content thereof to 0xFF.

Accordingly, the controller 230 may judge whether or not the first buffer storage area 260 is written with another data by checking the first specific bit and the second specific bit of the first data area, and obtain a data storage state of the first buffer storage area 260, and therefore an "empty" buffer storage area may be selected for writing data thereon, and data copy may be performed accordingly, such that the speed for accessing data is improved.

If the controller 230 judges that the first buffer storage area 260 is written with another data, the controller 230 then stores the data into the second data area, and meanwhile a second mark data is written into the second mark area for marking the blocks written with data in the second data area (step S406). Thereafter, information that data is written into the second data area is further recorded to a first specific bit of the second data area by the controller 230. The first specific bit (generally located at the last of the second data area) may be a bit selected from the second data area, and a function thereof is the same to that of the first specific bit of the first data area, and the detailed description thereof will not be repeated.

After the data is stored into the second data area, the controller 230 copies the data stored in the first data area to the second data area, and remains the blocks in the second data area that are marked by the second mark data as being written with data uncovered (step S407). Moreover, after the data stored in the first data area is copied to the second data area, a record is further written into a second specific bit of the second data area by the controller 230, wherein functions of the second specific bit is the same to that of the second specific bit of the first data area, and the detailed description thereof will not be repeated.

Finally, the controller 230 removes the data stored in the first buffer storage area 260 (step S408). In the present embodiment, the step of removing the data stored in the first buffer storage area 260 includes removing the data stored in the first buffer storage area 260 and changing the content thereof to 0xFF.

Figure 5:
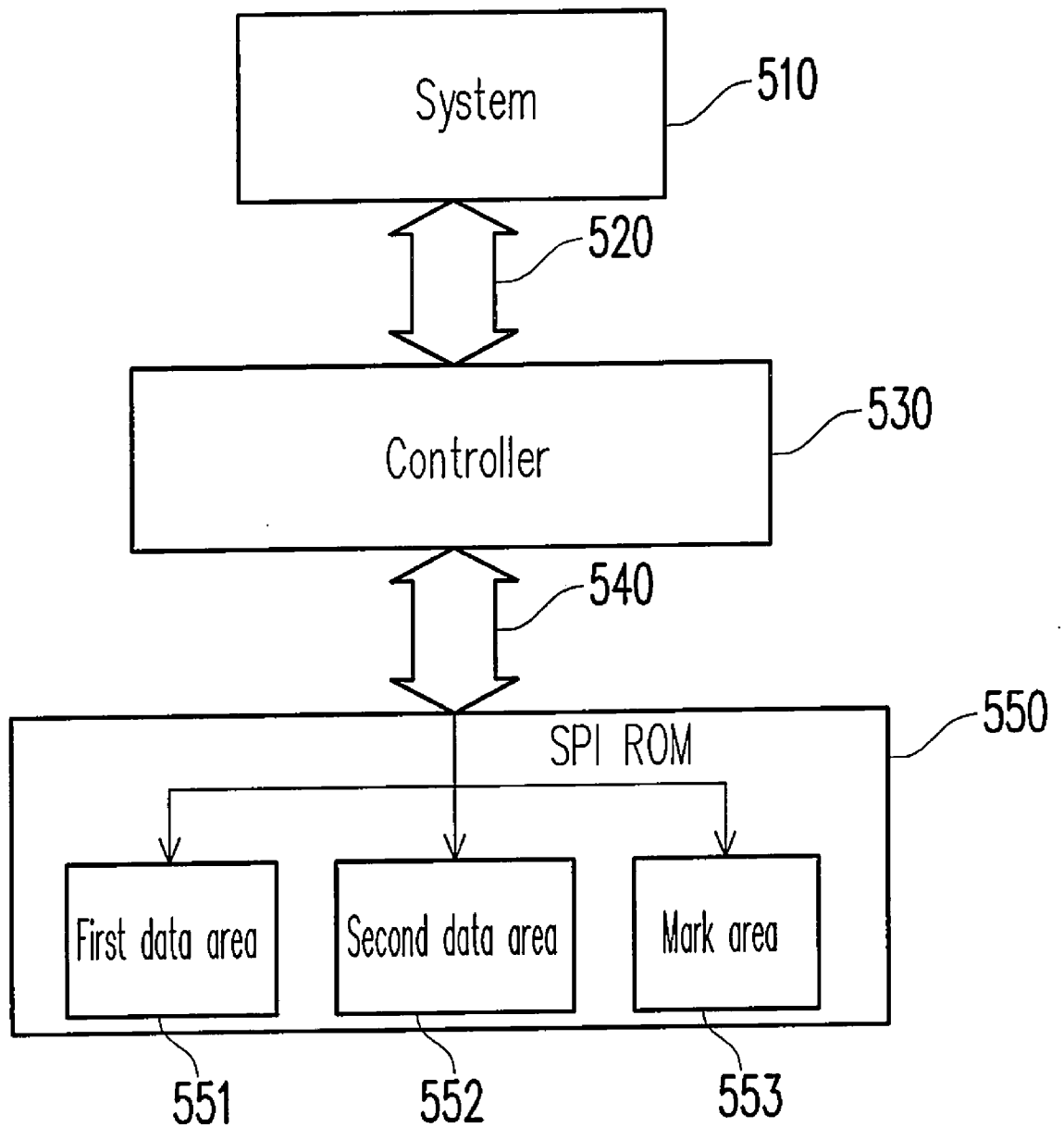
FIG. 5 is a block diagram illustrating a system applying a method for storing data according to another exemplary embodiment of the present invention.

FIG. 5 is a block diagram illustrating a system applying a method for storing data according to another exemplary embodiment of the present invention. The structure includes a system 510, a LPC bus 520, a controller 530, a SPI bus 540 and a SPI ROM 550. A main difference between embodiments of FIG. 5 and FIG. 2 lies in a division method of the SPI ROM 550. In the present embodiment, the SPI ROM is divided into three areas, respectively are a first data area 551, a second data area 552 and a mark area 553, and the sizes of the first data area 551, the second data area 552 and the mark area 553 are all the same, which is 4K bytes each, for example.

When the data storage instruction is executed, regardless of storing the data into the first data area 551 or into the second data area 552, the first mark data and the second mark data are all stored into the mark area 553. This is because the data may not be simultaneously stored into the first data area 551 and the second data area 552, and therefore the mark area 553 may be shared. By such means, the first data area 551 and the second data area 552 may be enlarged and utilization efficiency of the memory is improved.

Figure 6:
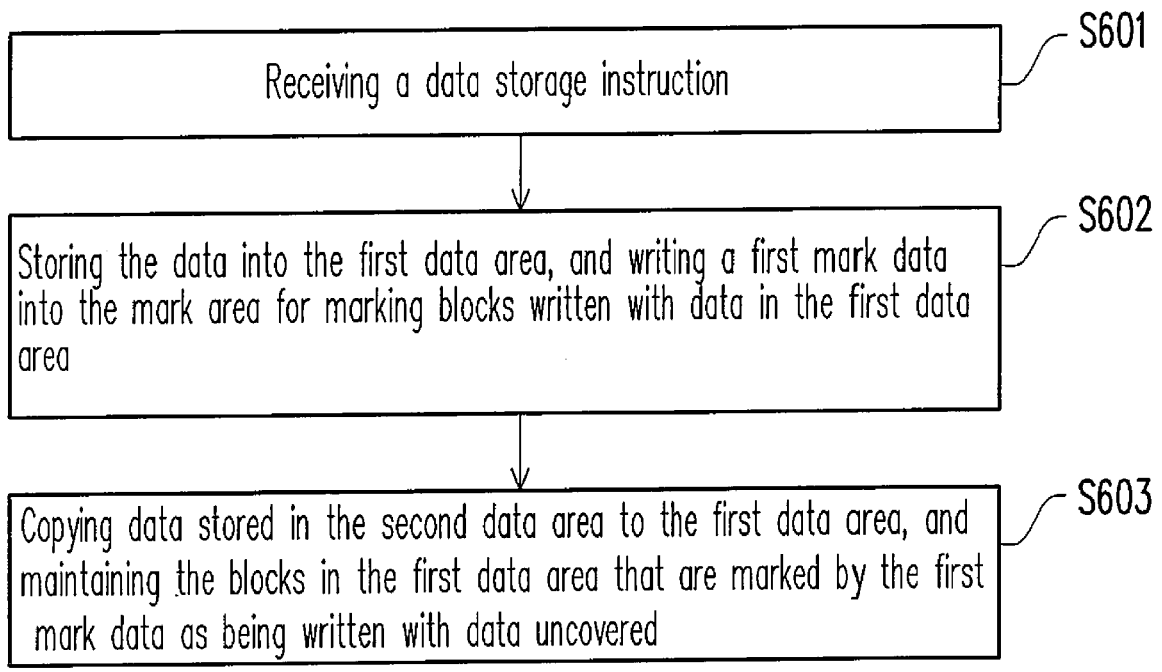
FIG. 6 is a flowchart illustrating a method for storing data according to another exemplary embodiment of the present invention.

FIG. 6 is a flowchart illustrating a method for storing data according to another exemplary embodiment of the present invention. Referring to FIG. 6, a main objective of this method is to store the data into the program memory used for storing program codes. In the present embodiment, the program memory used for storing program codes may be a SPI ROM. Referring to FIG. 5 and FIG. 6, in the present embodiment, the controller 530 divides the SPI ROM 550 into the first data area 551, the second data area 552 and the mark area 553.

Referring to FIG. 6 again, first, the controller 530 receives a data storage instruction from the system 510 (step S610). Next, the controller 530 stores the data into the first data area 551, and writes first mark data into the mark area 553 (step S620). Wherein, the first mark data is written in order to marking the blocks written with data in the first data area 551, so as to guarantee the data on the blocks is not covered by data copied to the first data area 551. Finally, the data stored on the second data area 552 is copied to the first data area 551 (step S630). During data copy, the data stored in the second data area 552 may only be copied to the blocks not written with data in the first data area 552 according to the first mark data, so as to guarantee the marked blocks written with data in the first data area 552 is not covered.

Figure 7:
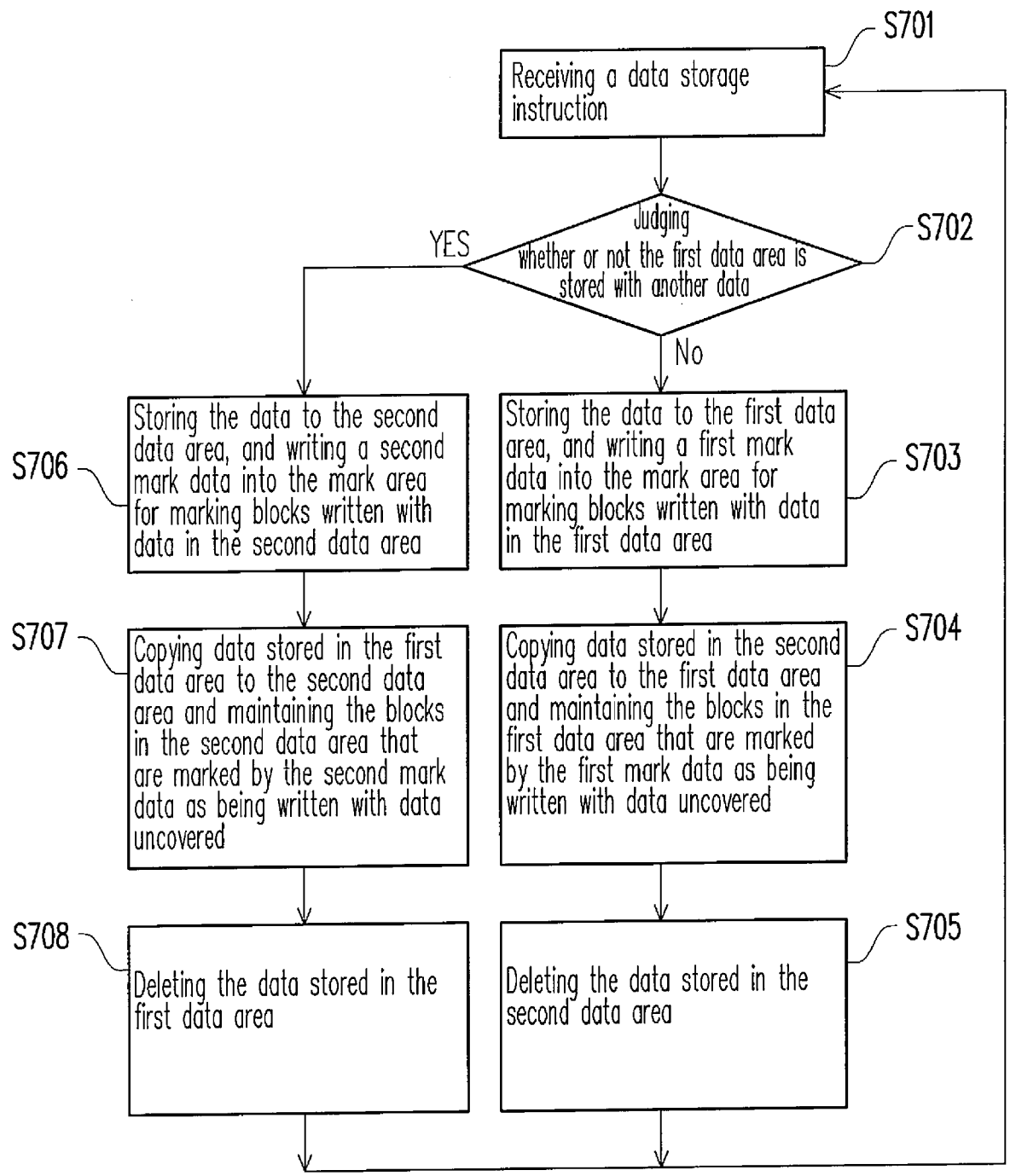
FIG. 7 is a flowchart illustrating a method for storing data according to another exemplary embodiment of the present invention.

FIG. 7 is a flowchart illustrating a method for storing data according to another exemplary embodiment of the present invention. Referring to FIG. 5 and FIG. 7, in the present embodiment, the controller 530 divides the SPI ROM 550 into the first data area 551, the second data area 552 and the mark area 553 respectively with a size of 4K bytes. By such division method, each byte in the data area corresponds to a byte in the mark area 553, and each time when data is written into a certain byte of the data area, a corresponding byte in the mark area 553 is then marked for indicating that the byte in the data area is written with data.

It should be noted that in such division method, each byte in the data area corresponds to a bit in the mark area 533, and each time when data is written into a certain byte of the data area, a corresponding bit in the mark area 553 is then marked (for example, written with "0") for indicating that the byte in the data area is written with data. Moreover, size of the mark data is only one bit, and compared to the conventional division method applying a byte for marking, occupied memory space based on such division method is only one eighth compared to that of the conventional division method (one byte has eight bits), such that memory space is effectively saved. However, the aforementioned division methods are only for examples, and the present invention is not limited thereto. Those skilled in the art should be understood that the memory space with different sizes may also be applied for marking data according to an actual requirement. Detailed description of the method for storing data of the present invention is set forth below:

First, the controller 530 receives a data storage instruction from the system 510 (step S701). After the controller 530 receives the data storage instruction, whether or not the first data area 551 is stored with another data is then judged (step S702). If not, the first data area 551 is then free to be written with data, and the controller 530 then stores the data into the first data area 551. Conversely, if yes, the controller 530 then stores the data into the second data area 552.

In the step S702, if the first data area 551 has no data stored thereon, the controller 530 then stores the data to the first data area 551, and writes first mark data into the mark area 553 for marking blocks written with data in the first data area 551 (step S703). For example, if a tenth bit of the mark area 553 is written with 00, it represents the block of the tenth bit in the first data area 551 is written with data.

It should be noted that in step S703, information that data is written into the first data area 551 is further recorded to a first specific bit of the first data area 551 by the controller 530. The first specific bit may be a bit selected from the first data area 551 (which is generally located in the last of the first data area 551), and is used for recording whether or not the first data area 551 is written with data, so as to provide such information for judgement of the controller when a next data is written. For example, "0" may be assigned to represent the first data area 551 is written with data, and if the controller reads a value "0" from the first specific bit, it represents that the first data area 551 is written with data, and now the data may be written into the second data area 552. Correspondingly, if the controller reads a value "1" from the first specific bit, it represents that the first data area 551 is not written with data, and now the data may be written into the first data area 551.

Next, after the data is stored into the first data area 551, the controller 530 copies data stored in the second data area 552 to the first data area 551 and remains the blocks in the first data area 551 that are marked by the first mark data as being written with data uncovered (step S705). After the data stored in the second data area 552 is copied to the first data area 551, a record is further written into a second specific bit of the first data area 551 by the controller 530. The second specific bit is another bit selected from the first data area 551 for recording information that data copy is complete. For example, if the second specific bit is "0", it represents the data stored in the second data area 552 is copied to the first data area 551, and therefore when the controller 530 reads the value "0" from the second specific bit, it represents the data stored in the second data area 552 is copied to the first area 551. Correspondingly, if the controller 530 reads a value "1" from the second specific bit, it represents that the data stored in the second data area 522 is still not copied to the first area 551.

Finally, the controller 530 removes the data stored in the second data area 552 (step S705). In the present embodiment, the step of removing the data stored in the second data area 552 includes removing the data stored in the second data area 522 and changing the content thereof to 0xFF.

Accordingly, the controller 530 may judge whether or not the first data area 551 is stored with another data by checking the first specific bit and the second specific bit of the first data area 551, and obtain a data storage state of the first data area 551, and therefore an "empty" data area may be selected for writing data, and data copy may be performed accordingly, such that the speed for accessing data is improved.

If the controller 530 judges that the first data area 551 is written with another data, the controller 530 then stores the data into the second data area 552, and writes a second mark data to the mark area 553 for marking the blocks written with data in the second data area 522 (step S706). Thereafter, information that the data is written into the second data area 522 is further recorded to a first specific bit of the second data area 522 by the controller 530. The first specific bit may be a bit selected from the second data area 522 (generally located in the last of the second data area 552), and a function thereof is the same to that of the first specific bit of the first data area 551, and the detailed description thereof will not be repeated.

After the data is stored into the second data area 552, the controller 530 copies the data stored in the first data area 551 to the second data area 552, and remains the blocks in the second data area 552 that are marked by the second mark data as being written with data uncovered (step S707). Moreover, after the data stored in the first data area 551 is copied to the second data area 552, a record is further written into a second specific bit of the second data area 552 by the controller 230, wherein the function of the second specific bit is the same to that of the second specific bit of the first data area 551, and the detailed description thereof will not be repeated.

Finally, the controller 530 removes the data stored in the first data area 551 (step S708). In the present embodiment, the step of removing the data stored in the first data area 551 includes removing the data stored in the first data area 551 and changing the content thereof to 0xFF.

In summary, in the present invention, two data areas and their corresponding mark areas are arranged in the program memory, and the data are alternately stored into the two data areas, such that the purpose for storing instantly accessible data in the program memory is achieved, and the conventional data memory may be totally substituted by the program memory. Accordingly, the space of a motherboard can be saved and there is no need to use expensive data memories, such that the cost of the product may be effectively reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for storing data, suitable for storing data into a program memory used for storing program codes, the program memory comprising a first buffer storage area and a second buffer storage area, wherein the first buffer storage area comprises a first data area and a first mark area, and the second buffer storage area comprises a second data area and a second mark area, both the first buffer storage area and the second buffer storage area contain data and the method comprising:

removing the data in the first buffer storage area after the data stored in the first data area is copied to the second data area;

receiving a first data storage instruction;

storing first data into the first data area, and writing a first mark data into the first mark area for marking blocks written with the first data in the first data area;

copying data stored in the second data area to the first data area, and remaining the blocks in the first data area that are marked by the first mark data as being written with the first data uncovered after the first data is stored into the first data area; and removing the data in the second buffer storage area after the data stored in the second data area is copied to the first data area, wherein the first data and the data stored in the first buffer storage area are not removed simultaneously.

2. The method for storing data as claimed in claim 1, wherein after removing the data in the second buffer storage area, the method further comprises:

receiving another data storage instruction;

storing another data into the second data area, and writing a second mark data into the second mark area for marking blocks written with the another data in the second data area;

copying the first data stored in the first data area to the second data area, and remaining the blocks in the second data area that are marked by the second mark data as being written with the another data uncovered after the another data is stored into the second data area; and removing the first data stored in the first buffer storage area after the first data stored in the first data area is copied to the second data area, wherein the another data and the first data stored in the second buffer data area are not removed simultaneously.

3. The method for storing data as claimed in claim 1, wherein after receiving the data storage instruction, the method further comprises:

judging whether or not another data is stored in the first buffer storage area;

if no data is stored in the first buffer storage area, storing the first data into the first data area; and if another data is stored in the first buffer storage area, storing the first data into the second data area.

4. The method for storing data as claimed in claim 1, wherein the step of storing the first data into the first data area further comprises:

recording information that the first data is written into the first data area to a first specific bit in the first data area.

5. The method for storing data as claimed in claim 4, wherein after copying data stored in the second data area to the first data area, the method further comprises:

recording information that the data stored in the second data area is copied to a second specific bit in the first data area.

6. The method for storing data as claimed in claim 5, wherein after receiving the data storage instruction, the method further comprises:

judging a present data storage state by checking the first specific bit and the second specific bit of the first data area.

7. The method for storing data as claimed in claim 1, wherein the step of removing the data stored in the second buffer storage area after the data stored in the second data area is copied to the first data area comprises removing the data stored in the second buffer storage area and changing the content thereof to 0xFF.

8. The method for storing data as claimed in claim 1, wherein the data storage instruction is sent by a microprocessor of a system, and the first buffer storage area and the second buffer storage area are divided according to an actual data storage requirement of the system.

9. The method for storing data as claimed in claim 1, wherein the program memory is a serial peripheral interface read-only memory (SPI ROM), and the first data is an instantly accessible data originally stored in an electrically erasable programmable read-only memory (EEPROM).

10. A method for storing data, suitable for storing data into a program memory used for storing program codes, the program memory comprising a first data area, a second data area and a mark area, both the first buffer storage area and the second buffer storage area contain data and the method for storing data comprising:

removing the data in the first buffer storage area after the data stored in the first data area is copied to the second data area;

receiving a first data storage instruction;

storing first data into the first data area, and writing a first mark data into the mark area for marking blocks written with the first data in the first data area;

copying data stored in the second data area to the first data area, and remaining the blocks in the first data area that are marked by the first mark data as being written with the first data uncovered after the first data is stored into the first data area; and removing the data in the second data area after the data stored in the second data area is copied to the first data area, wherein the first data stored in the first data area and the data copied into the first data area are not removed simultaneously.

11. The method for storing data as claimed in claim 10, wherein after removing the data in the second data area, the method further comprises:

receiving another data storage instruction;

storing another data into the second data area, and writing a second mark data into the mark area for marking blocks written with the another data in the second data area;

copying the first data stored in the first data area to the second data area, and remaining the blocks in the second data area that are marked by the second mark data as being written with the another data uncovered after the another data is stored into the second data area; and removing data stored in the first data area after the first data stored in the first data area is copied to the second data area, wherein the another data stored in the second data area and the first data copied into the second data area are not removed simultaneously.

12. The method for storing data as claimed in claim 10, wherein after receiving the data storage instruction, the method further comprises:

judging whether or not another data is stored in the first data area;

if no data is stored in the first data area, storing the first data into the first data area; and if another data is stored in the first data area, storing the first data into the second data area.

13. The method for storing data as claimed in claim 10, wherein the step of storing the first data into the first data area further comprises:

recording information that the first data is written into the first data area to a first specific bit in the first data area.

14. The method for storing data as claimed in claim 13, wherein after copying data stored in the second data area to the first data area, the method further comprises:

recording information that the data stored in the second data area is copied to a second specific bit in the first data area.

15. The method for storing data as claimed in claim 14, wherein after receiving the data storage instruction, the method further comprises:

judging a present data storage state by checking the first specific bit and the second specific bit of the first data area.

16. The method for storing data as claimed in claim 10, wherein the step of removing the data stored in the second data area after the data stored in the second data area is copied to the first data area comprises removing the data stored in the second data area and changing the content thereof to 0xFF.

17. The method for storing data as claimed in claim 10, wherein the data storage instruction is sent by a microprocessor of a system, and the first data area and the second data area are divided according to an actual data storage requirement of the system.

* * * * *